(12) United States Patent
Ishizawa et al.

(10) Patent No.: US 7,760,447 B2
(45) Date of Patent: Jul. 20, 2010

(54) OPTICAL MEMBER AND METHOD FOR MANUFACTURING THE SAME

(75) Inventors: Hitoshi Ishizawa, Kawasaki (JP); Tomohiko Yamahiro, Chigasaki (JP); Yasuto Matsuba, Tama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/469,805

(22) Filed: May 21, 2009

(65) Prior Publication Data

US 2009/0284848 A1 Nov. 19, 2009

Related U.S. Application Data

(63) Continuation of application No. PCT/JP2007/072514, filed on Nov. 21, 2007.

(30) Foreign Application Priority Data

Nov. 21, 2006 (JP) .............................. 2006-313717

(51) Int. Cl.
 *G02B 7/02* (2006.01)
(52) U.S. Cl. ...................... 359/811; 359/819; 362/538; 264/1.32; 264/1.38; 428/76
(58) Field of Classification Search ................ 359/811, 359/819, 350, 642, 796; 396/6, 72, 144, 396/335, 376, 529; 427/162, 164, 240, 372.2; 264/1.32, 1.38, 1.7, 2.6; 362/257, 507, 509, 362/510, 538; 65/37, 59.4, 60.1, 60.2
See application file for complete search history.

(56) References Cited

U.S. PATENT DOCUMENTS

| | | | | |
|---|---|---|---|---|
| 3,801,808 | A | * 4/1974 | Johnson | ....................... 362/257 |
| 4,118,898 | A | * 10/1978 | Godot | ........................ 451/390 |
| 5,137,767 | A | * 8/1992 | Miyauchi et al. | .............. 428/76 |
| 5,529,728 | A | * 6/1996 | Buazza et al. | .............. 264/1.38 |
| 5,851,255 | A | 12/1998 | Ohtsuki et al. | |
| 6,896,396 | B2 | * 5/2005 | Yagi | ........................... 362/510 |
| 6,916,503 | B2 | * 7/2005 | Morikawa et al. | ........... 427/240 |
| 7,059,752 | B2 | * 6/2006 | Yagi et al. | ................... 362/538 |
| 7,651,775 | B2 | * 1/2010 | Suzuki et al. | ............... 428/446 |
| 7,660,051 | B2 | * 2/2010 | Asai et al. | .................... 359/796 |
| 2002/0005997 | A1 | 1/2002 | Oba | |
| 2003/0044530 | A1 | 3/2003 | Morikawa et al. | |
| 2003/0095344 | A1 | 5/2003 | Ito et al. | |

FOREIGN PATENT DOCUMENTS

| | | |
|---|---|---|
| JP | 09-258084 A | 10/1997 |
| JP | 2002-098878 A | 4/2002 |
| JP | 2002-263553 A | 9/2002 |
| JP | 2003-156601 A | 5/2003 |
| JP | 2005-148551 A | 6/2005 |
| JP | 2006-231282 A | 9/2006 |

\* cited by examiner

*Primary Examiner*—Loha Ben
(74) *Attorney, Agent, or Firm*—Miles & Stockbridge P.C.

(57) ABSTRACT

A method, for producing an optical member, includes attaching a holding member, which is used integrally with a lens, to the lens so that the holding member is brought into contact with a periphery of the lens to hold the lens, and then forming an optical thin film on a surface of the lens by a spin coating to obtain the optical member.

12 Claims, 4 Drawing Sheets

US 7,760,447 B2

OPTICAL MEMBER AND METHOD FOR MANUFACTURING THE SAME

CROSS-REFERENCE

This application is a Continuation Application of International Application No. PCT/JP2007/072514 which was filed on Nov. 21, 2007 claiming the conventional priority of Japanese patent Applications No. 2006-313717 filed on Nov. 21, 2006.

BACKGROUND OF THE INVENTION

1. Field of the Invention

The present invention relates to an optical member and a method for producing the same.

2. Description of the Related Art

In general, individual lenses, which constitute an optical system of, for example, a camera lens and an objective lens of microscope, each have a surface which is coated with an anti-reflective film (optical thin film) so as to reduce the reflection of the light. A lens, on which such an optical thin film is formed, is disclosed, for example, in Japanese Patent Application Laid-open No. 2005-148551.

In general, the optical thin film as described above has been hitherto formed by the vapor deposition method including the sputtering method, the vacuum vapor deposition method, etc. According to the method for forming the optical thin film as described above, it is possible to form the optical thin film which has high performance and which realizes the low reflection in a wide wavelength range. However, in the method for forming the optical thin film as described above, it is difficult to form an optical thin film, having a uniform thickness (film thickness), on a surface of a lens having an intense curvature; a problem arises such that the film is thinned especially at circumferential or peripheral portions of the lens. Therefore, in the optical member obtained by adopting the method for forming the optical thin film as described above, the reflectance greatly differs (or varies) between the central portion and the peripheral portion of the lens in some cases, resulting in a problem such that the imaging performance is lowered, and/or ghost or any flare appears, etc.

In view of the above, in order to fundamentally solve the problems as described above, the following method has been adopted as a method for producing an optical member. That is, a wet film formation method, which is excellent in the performance of uniform film formation, is adopted to form an optical thin film on a surface of a lens (lens surface). In such a wet film formation method, the optical thin film can be formed by utilizing such a property that the coating liquid or solution flows following the curved surface of the lens. Therefore, an optical thin film, which has a uniform thickness, can be formed relatively easily. Among examples of the wet film formation method as described above, the spin coating method (spin coating) is a method capable of forming a film having a uniform film thickness as compared with the vapor deposition method, because the film is formed such that a coating liquid, which is applied to or coated on a lens, is spread thinly and uniformly by the centrifugal force brought about by rotation.

However, the conventional method for producing the optical member, which adopts the spin coating as described above, is not necessarily sufficient in relation to the formation of an optical thin film having sufficiently high uniformity of the film thickness. For example, in a case of an optical thin film is formed on a lens in which the ratio (D/R) between the diameter (D) of the lens and the radius of curvature (R) is close to 2, the coating liquid is moved, during a period until the coating liquid is dried, toward a peripheral portion of a lens at which the centrifugal force is applied more strongly, which in turn results in the coating liquid being pooled in the peripheral portion. This causes a problem such that the film thickness is thickened or great at the peripheral portion. In a case that an optical thin film is formed on a lens which has a relatively small diameter and which is to be used for an objective lens of a microscope, the following tendency arises. That is, the centrifugal force is hardly applied even when the rotation is performed at a high speed; and thus the coating liquid is inadequately separated and discontinued, and a thick liquid pool appears at the peripheral portion of the lens.

Further, in the above-described conventional method for producing the optical member in which the spin coating is adopted, when the lens is detached from a spin coater, the coating liquid is not cured on the coat surface (coated surface) immediately after the coating was performed. Therefore, it is necessary to take precautions not to touch the coat surface, wherein the operability is not sufficient. In particular, in a case that the lens is small and/or that the edge thickness is small, then there is a high possibility that the coat surface is touched, thereby further lowering the operability. Further, in a case that the spin coating is adopted, the coating liquid coated on a surface of the lens flows and arrives at the other surface (back surface) on the side opposite to the coat surface, depending on the shape of the lens. In particular, when the lens is chucked by the sucking, the following problem arises. That is, the coating liquid is sucked through the gap between the lens and a lens-fixing jig, and thus the back surface is dirtied by the sucked coating liquid.

SUMMARY OF THE INVENTION

The present invention has been made while taking the foregoing problems in the conventional techniques into consideration, an object of which is to provide a method for producing an optical member which is capable of forming, on a surface of a lens while adopting the spin coating, an optical thin film having sufficiently high uniformity of a thickness, and at high operability even when the lens is small and/or when the lens has a thin edge thickness, which is capable of sufficiently preventing a coating liquid from flowing (moving) to and arriving at a back surface of the lens, and which is capable of producing the optical member stably and efficiently, as well as to provide an optical member obtained by the production method.

The inventors found out, through repeated and diligent studies and investigations in order to achieve the object described above, that by attaching, to a lens, a holding member which is used integrally with the lens so that the holding member is brought into contact with (made to abut against) a periphery or circumference of the lens to hold the lens, and then by forming an optical thin film on a surface of the lens by the spin coating, then it is possible to form the optical thin film, which has sufficiently high uniformity of the thickness, on a surface of the lens while adopting the spin coating; it is possible to form the optical thin film at high operability even when the lens is small and/or when the lens has a thin edge thickness; and it is possible to sufficiently prevent a coating liquid from flowing or moving to and arriving at the back surface of the lens, thereby making it possible to produce or manufacture the optical member stably and efficiently. Thus, the inventors have completed the present invention.

That is, a method for producing an optical member according to the present invention is a method comprising attaching a holding member, which is used integrally with a lens, to the lens so that the holding member is brought into contact with a periphery of the lens to hold the lens, and then forming an optical thin film on a surface of the lens by a spin coating to obtain the optical member.

In the above-described method for producing the optical member of the present invention, the spin coating is performed after fixing the lens to the holding member as described above. Therefore, the coating liquid supplied to the lens flows on the surface of the holding member, and thus it is possible to sufficiently prevent the coating liquid from being pooled at the circumferential edge portion (periphery) of the lens. Therefore, on the surface of the lens, the film thickness of the formed optical thin film is uniform between the central portion and the circumferential edge portion of the lens. Further, in the method for producing the optical member of the present invention, since the holding member is attached, the handling of the lens is easy and the operability is sufficiently improved even when the lens is small and thus is difficult to grip or grasp the lens. Furthermore, in the method for producing the optical member of the present invention, since the holding member is attached to the lens, any excessive coating liquid or solution is allowed to flow to the end portion of the holding member in accordance with the rotation and then is scattered to the surroundings. Therefore, the coating liquid is sufficiently prevented from flowing to and arriving at the back surface of the lens. For example, when an opening of the holding member is directed in the upward direction or in the downward direction, then any excessive coating liquid is merely scattered to the surroundings in accordance with the rotation, thereby preventing the coating liquid from flowing to and arriving at the back surface of the lens. Therefore, according to the present invention, it is possible to stably produce the optical member.

In another aspect, an optical member according to the present invention comprises: a lens; a holding member which is attached to the lens so that the holding member is brought into contact with a periphery of the lens to hold the lens and which is used integrally with the lens; and an optical thin film which is formed on a surface of the lens and on a surface of the holding member brought into contact with the periphery of the lens.

The optical member of the present invention as described above can be produced or manufactured by adopting the above-described method for producing the optical member of the present invention. Therefore, in the optical member of the present invention, the optical thin film, in which the uniformity of the film thickness is sufficiently high, is formed on the surface of the lens. Further, in the optical member of the present invention as described above, the holding member is used integrally with the lens. Therefore, even when the lens is small, the lens can be handled with ease; and further by changing the size, the shape, etc. of the holding member depending on the way of use, the optical member of the present invention can be used as it is for the camera lens, the objective lens of the microscope, etc., thereby making the optical member of the present invention be adaptable to a variety of ways of use, and be usable widely and reasonably.

In the optical member of the present invention described above and the method for producing the optical member of the present invention described above, it is preferable that the holding member is brought into contact with an area, of the lens, which is not less than 90% of the entire periphery of the lens.

In a case that the area, with which the holding member is brought into contact, is an area of less than 90% of the entire periphery of the lens, when the spin coating is performed, the coating liquid flows from any area of the periphery of the lens with which the holding member is not brought into contact, and the coating liquid arrives at the back surface of the lens, depending on the shape of the lens; thereby making it difficult to produce the optical member stably. Further, this gives rise to a tendency that the uniformity of the formed film of the optical thin film is deteriorated, and that the uniformity of the optical performance of the obtained optical member is deteriorated.

In the optical member of the present invention described above and the method for producing the optical member of the present invention described above, a thickness at an edge of the lens may be not more than 5 mm.

In the present invention, even with a thin lens in which the edge thickness is not more than 5 mm as described above, since the holding member as described above is used, it is possible to stably and efficiently produce an optical member which is handled with ease, which provides high operability, and on which an optical thin film having sufficiently high uniformity is formed.

In the optical member of the present invention described above and the method for producing the optical member of the present invention described above, a ratio between a diameter of the lens and a radius of curvature of the lens may be within a range of 1.5 to 2.0.

As described above, in the present invention, it is possible to form the optical thin film, of which film thickness has a sufficiently high uniformity, on a concave lens and a convex lens which exhibit a value of D/R within the range of 1.5 to 2.0; and it is possible to obtain an optical member in which the spectral reflection characteristic is sufficiently uniform.

In the optical member of the present invention described above and the method for producing the optical member of the present invention described above, it is preferable that an edge surface, which is a surface of the holding member brought into contact with the surface of the lens and which is substantially parallel to a central axis of the lens, has a height of not more than 0.5 mm.

If the edge surface as described above has a height exceeding 0.5 mm, then any liquid pool of the coating liquid appears at a portion of difference in height (a stepped portion) which is generated between the holding member and the lens at the joined portion (contact portion) between the holding member and the lens. This causes a tendency to arise such that it is difficult to form the optical thin film having a higher uniformity. In other words, in such a case that the height of the edge surface as described above is not more than 0.5 mm, then the coating liquid can be allowed to flow efficiently on the surface of the holding member in the spin coating, and it is possible to more sufficiently suppress the appearance of the liquid pool. Further, in view of suppressing the appearance of the liquid pool more sufficiently, it is especially preferable that the height of the edge surface is zero at the portion of the holding member at which the holding member is brought into contact with the lens surface. That is, in the present invention, it is especially preferable that the holding member is attached to the lens so that any difference in height does not appear between the lens and the holding member, at the portion of the holding member at which the holding member is brought into contact with the lens surface.

In the optical member of the present invention described above and the method for producing the optical member of the present invention described above, it is preferable that a thickness of the optical thin film is within a range of ±20% with respect to an average thickness in an entire area of the optical thin film.

If such an optical thin film has a film thickness which is outside or without the range described above, then the uniformity of the optical thin film is deteriorated, giving rise to a tendency that the optical member does not exhibit any sufficiently uniform spectral reflection characteristic.

According to the present invention, it is possible to provide the method for producing the optical member which is capable of forming, on a surface of the lens, the optical thin film having sufficiently high uniformity in the film thickness, while adopting the spin coating; capable of forming the optical thin film at high operability even when the lens is small and/or when the lens has a thin edge thickness; capable of sufficiently preventing the coating liquid from flowing to and arriving at the back surface of the lens; and capable of producing the optical member stably and efficiently, as well as to provide the optical member obtained by the production method.

Figure 1:
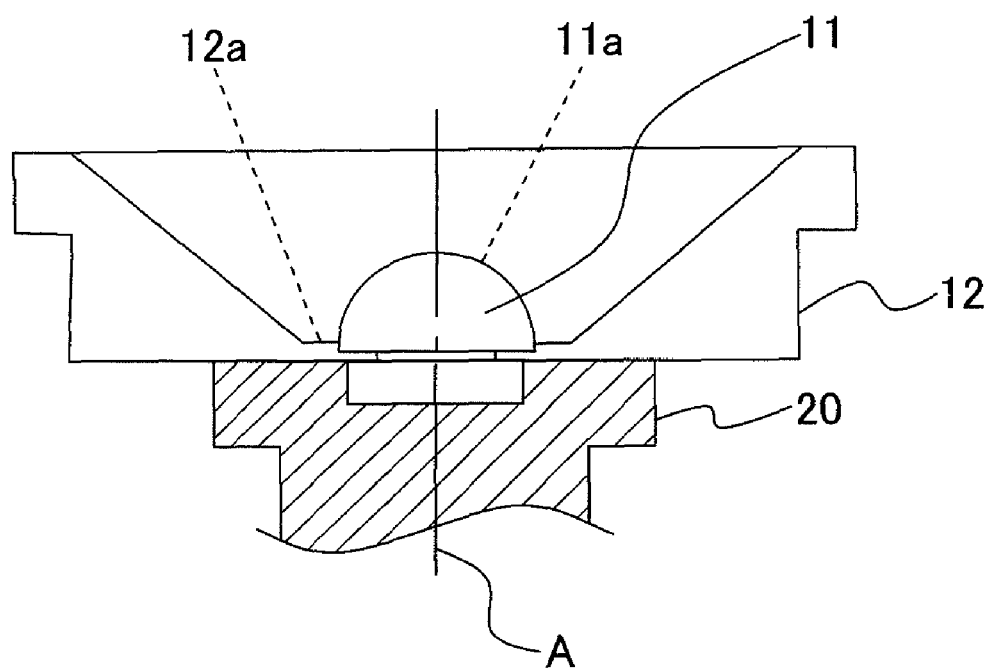
FIG. 1 is a schematic vertical sectional view of a preferred embodiment of a lens as depicted in a state that a holding member is attached.

DESCRIPTION OF THE PREFERRED
EMBODIMENTS OF THE INVENTION

A detailed explanation will be made below, with reference to the drawings, about preferred embodiments of the optical member of the present invention and the method for producing the optical member of the present invention. In the following description and the drawings, same or equivalent elements are designated by same reference numerals, any overlapping explanation of which will be omitted.

FIG. 1 is a schematic vertical sectional view of a preferred embodiment of a lens as depicted in a state that a holding member is attached. As shown in FIG. 1, a holding member 12 is attached so that the holding member 12 is brought into contact with the periphery or circumference of the lens to hold the lens 11. The lens 11 is attached to a support member 20 of a spin coater via the holding member 12. In the present invention, the holding member 12 is attached to the lens 11, and then an optical thin film is formed on a surface 11a of the lens 11 by the spin coating to obtain an optical member.

Figure 2:
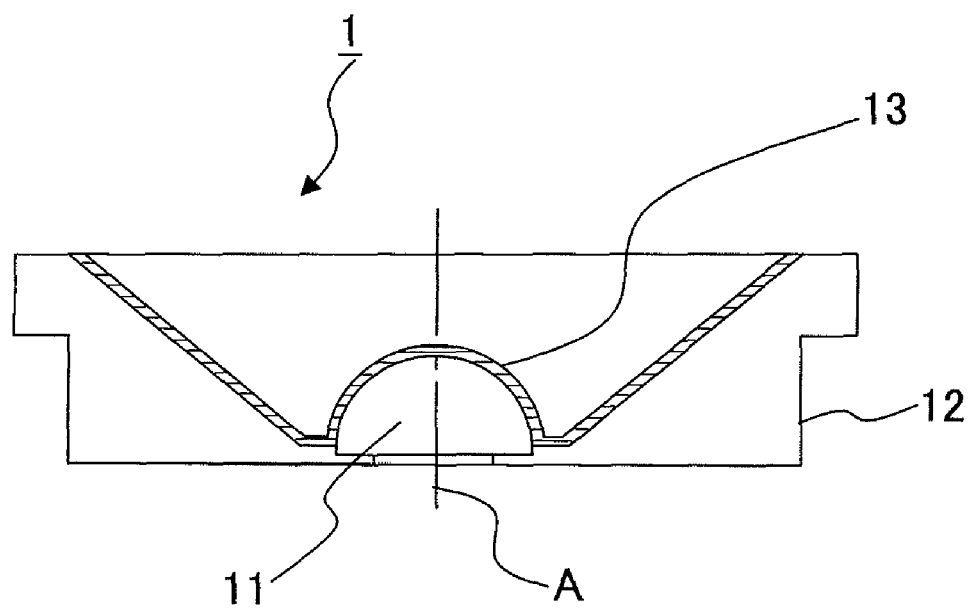
FIG. 2 is a schematic vertical sectional view of a preferred embodiment of an optical thin film of the present invention.

FIG. 2 is a schematic vertical sectional view of a preferred embodiment of the optical thin film of the present invention, wherein the optical thin film is formed, for example, on the lens shown in FIG. 1. As shown in FIG. 2, the optical member 1 includes the lens 11, the holding member 12 which is attached so that the holding member 12 is brought into contact with the periphery of the lens to hold the lens, and an optical thin film 13 which is formed on a surface of the lens 11 and on a surface of the holding member 12 brought into contact with the periphery of the lens.

In the present invention, a ratio (D/R) between the diameter (D) of the lens 11 and the radius of curvature (R) of the lens can be appropriately set depending on the usage of the optical member, etc. The ratio (D/R) is not especially limited. It is also allowable to use, for example, a lens in which the value of D/R is within a range of 1.5 to 2.0. In the present invention, even with a lens in which the value of D/R is within the range of 1.5 to 2.0, the lens is attached to the holding member 12, and then the optical thin film 13 is formed by the spin coating. Therefore, when the spin coating is performed, the coating liquid is dropped onto the lens 11 and the rotation is applied to the lens 11, thereby allowing the coating liquid to flow on the surface of the holding member 12. This makes any excessive coating liquid be scattered to the surroundings from the end of the holding member 12. Therefore, the coating liquid is sufficiently prevented from flowing to and arriving at the surface (back surface) on the side opposite to the coat surface of the lens 11; and further, the coating liquid is sufficiently prevented from being pooled at the circumferential edge portion of the lens 11. Thus, it is possible to form the optical thin film 13 having the sufficiently high uniformity of the film thickness. In this embodiment, a hemispherical lens having a value of D/R of 2.0 is used.

The diameter (D) of the lens 11 can be appropriately set depending on, for example, the usage of the obtained optical member, and is not especially limited. Even in a case of a small lens having a diameter of not more than 5 mm, for example, it is possible to use such small lens. Even in a case that the small lens, which has the diameter of not more than 5 mm, is used as described above, the spin coating is performed after attaching the holding member 12. Therefore, even in such a state that the coating liquid is not cured, the operation can be advanced without touching the coat surface, thereby making it possible to produce or manufacture the optical member efficiently. The term "diameter" referred to herein indicates the diameter of the circumscribed circle when the cross section of the lens is not circular. The center thickness of the lens 11 is not especially limited; and the thickness can be appropriately set depending on, for example, the usage of the optical member as the object. In this embodiment, a lens having a diameter of 8 mm is used as the lens 11 as described above.

In the present invention, the holding member 12 is attached to the lens 11 so that the holding member 12 is brought into contact with the periphery of the lens to hold the lens 11, and the holding member 12 is used integrally with the lens. This embodiment uses a ring-shaped holding member which has a recess at a central portion of the holding member for fixing the lens 11. The angle, which is formed between the surface 12a of the holding member 12 brought into contact with the lens surface 11a and the central axis A of the lens 11, is not especially limited. However, the angle is preferably adjusted in a range of 90° to 45°, and the angle is especially preferably adjusted to 90° in order that the coating liquid is allowed to flow efficiently on the surface of the lens 11 and the surface of the holding member 12 during the spin coating, and that the coating liquid is not pooled at the circumferential edge portion of the lens 11. The angle as described above can be appropriately changed depending on the shape of the lens and the number of revolutions during the spin coating. However, when the angle is within the range of 90° to 45°, the coating liquid can be allowed to flow efficiently on the surface 12a of the holding member even in a case that the lens has a lens shape in which D/R is relatively large. In this embodiment, the angle, which is formed between the surface 12a and the central axis A of the lens 11, is 90°.

The size of the holding member 12 is not especially limited, and the size can be appropriately adjusted in view of the usage of the optical member as the object, the operability during the spin coating, etc. The holding member is preferably designed so that the holding member serves also as a fixture or hardware of an objective lens. By designing the holding member as described above, it is possible to assemble the optical member as it is into various products after the completion of the spin coating. By forming the film in a state that the holding member 12 is attached to the lens during the spin coating and then by detaching the holding member 12, it is possible to prevent the coating liquid from flowing to and arriving at the back surface of the lens. However, when the lens has a small diameter and/or when the lens has a thin edge thickness, the handling is difficult afterwards.

The material for the optical thin film 13 is not especially limited. Any known material can be appropriately used depending on the performance of the optical thin film as the object. It is preferable to use, for example, magnesium fluoride ($MgF_2$), calcium fluoride ($CaF_2$), aluminum fluoride ($AlF_3$), silicon dioxide ($SiO_2$), cryolite ($Na_3AlF_6$), and the like. In this embodiment, the optical thin film 13 is formed of magnesium fluoride.

Further, the average film thickness of the optical thin film 13 is not especially limited. The average film thickness can be adjusted to a desired average film thickness depending on the performance of the optical thin film as the object. In this embodiment, the average film thickness as described above is 137 nm. The film thickness of the optical thin film 13 as described above is preferably within a range of ±20% with respect to the average film thickness, in the entire area of the optical thin film. The optical thin film, which has a high degree of uniformity in the film thickness such that the film thickness is within the foregoing range in the entire area, makes it possible to exhibit the extremely uniform antireflective characteristic.

Next, a preferred method of the spin coating will be explained. Any known method can be appropriately adopted as such spin coating. It is also allowable to adopt, for example, such a method for forming the optical thin film that a coating liquid, which contains the material for the optical thin film 13 as described above, is supplied onto the surface 11a of the lens 11, and the lens 11, etc. is rotated at a predetermined number of revolutions.

The solvent of such a coating liquid or solution is not especially limited. It is possible to appropriately use known solvents. For example, it is also allowable to appropriately use alcohols including, for example, propanol, butanol, pentanol, and the like. As for the solvent as described above, in view of forming the optical thin film 13 having the more uniform film thickness by the spin coating while suppressing the velocity of vaporization of the solvent, it is preferable to use solvents having low vapor pressure.

The concentration of the material for the optical thin film 13 in the coating liquid is not especially limited. The concentration can be appropriately changed in accordance with the condition of the spin coating in order to form the uniform optical thin film. In the present invention, the holding member 12 is used. Therefore, even when the spin coating is performed at a relatively low number of revolutions, it is possible to form the optical thin film having the sufficiently uniform film thickness. Therefore, it is unnecessary to raise the concentration of the coating liquid to be used for the spin coating, thereby making it possible to decrease the amount of use of the coating liquid to lower the cost, and to produce the optical member efficiently.

Further, the viscosity of the coating liquid is not especially limited as well. The viscosity can be appropriately changed in accordance with the condition of the spin coating. The method for preparing the coating liquid as described above is not especially limited, and it is possible to appropriately adopt any known method. It is also allowable to adopt, for example, methods as described in International Publication Nos. 2002/18982 and 2006/30848. The amount of supply of the coating liquid is not especially limited as well. The amount of supply can be appropriately adjusted depending on, for example, the size of the lens 11 and the thickness of the optical thin film 13 to be formed, and the like.

Upon performing the spin coating, it is preferable to rotate the lens 11 at a number of revolutions of 500 to 9000 rpm (more preferably 2000 to 4000 rpm) after supplying the coating liquid onto the surface 11a of the lens 11. By performing the rotation at the number of revolutions as described above, it is possible to form the optical thin film 13 having the uniform film thickness. Although not especially limited, when the spin coating is performed, it is preferable to rotate the lens 11 at the number of revolutions described above within 0 to 3 seconds after supplying the coating liquid onto the surface 11a of the lens 11. In the present invention, the holding member is attached as described above. Therefore, it is unnecessary to raise the number of revolutions (to raise up to not less than about 5000 rpm) for the purpose of improving the situation regarding the pooling of the liquid and the separation of the liquid when the spin coating is performed. It is possible to form the optical thin film having the sufficiently high uniformity at an ordinary number of revolutions (2000 to 4000 rpm). Therefore, according to the method for producing the optical member of the present invention, it is unnecessary to raise the concentration of the coating liquid to be used for the spin coating as well, and it is also possible to consequently decrease the amount of use of the coating liquid. Therefore, the cost is lowered, and the optical member can be produced efficiently.

In the present invention, various conditions, which include, for example, the temperature and the relative humidity during the spin coating, etc., are not especially limited. However, it is preferable to perform the spin coating under a condition in which the relative humidity is not more than 5 to 50% (more preferably 5 to 40%). By performing the spin coating under the condition as described above, there is a tendency that formation of any radial stripes in the formed optical thin film can be suppressed sufficiently. If the relative humidity is less than 5%, it is necessary to provide any special dehumidifying apparatus, thereby giving rise to a tendency that the cost is increased.

The apparatus, which is usable for the spin coating as described above, is not especially limited as well. It is possible to appropriately use any known apparatus.

The preferred embodiments of the optical member and the method for producing the optical member of the present invention have been explained above. However, the optical member and the method for producing the optical member of the present invention are not limited to the embodiments described above. For example, in the embodiment described above, the hemispherical lens is used as the lens 11. However, in the present invention, the shape of the lens is not especially limited, and it is possible to appropriately adopt various shapes of the lenses including, for example, plano-convex lenses, plano-concave lenses, double-convex lenses, and double-concave lenses, etc. depending on the usage of the optical member to be produced. In a case that the lens having the other shape as described above is used, it is also allowable to use a lens in which the edge thickness T (see the lens 11 shown in FIG. 3) is not more than 5 mm. In the present invention, the holding member is used as described above. Therefore, even in the case of the small lens in which the edge thickness T is not more than 5 mm as described above, it is possible to form the optical thin film having the sufficiently uniform film thickness and the good operability.

Figure 3:
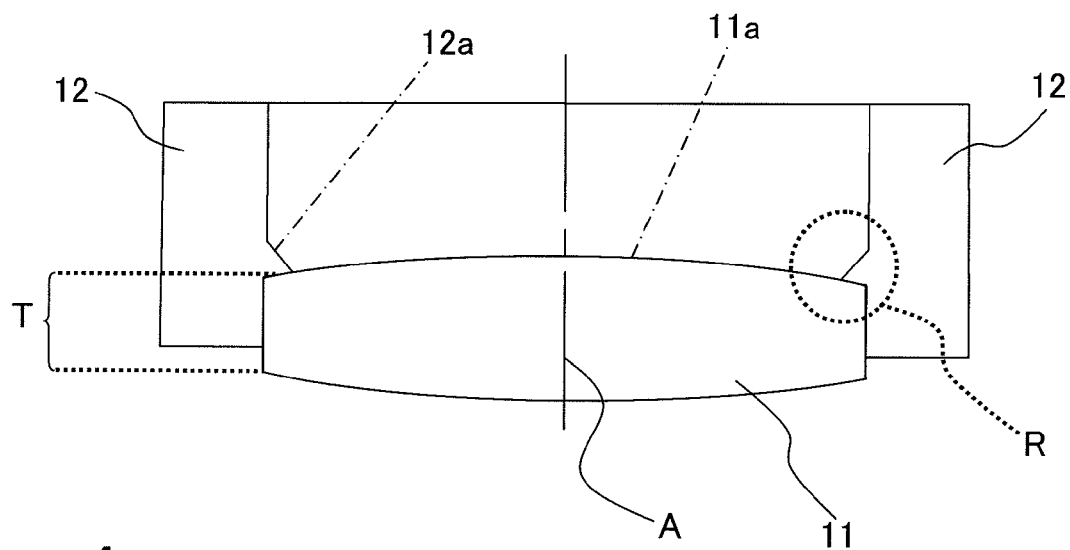
FIG. 3 is a schematic vertical sectional view of another preferred embodiment of a lens as depicted in a state that a holding member is attached.
Figure 4:
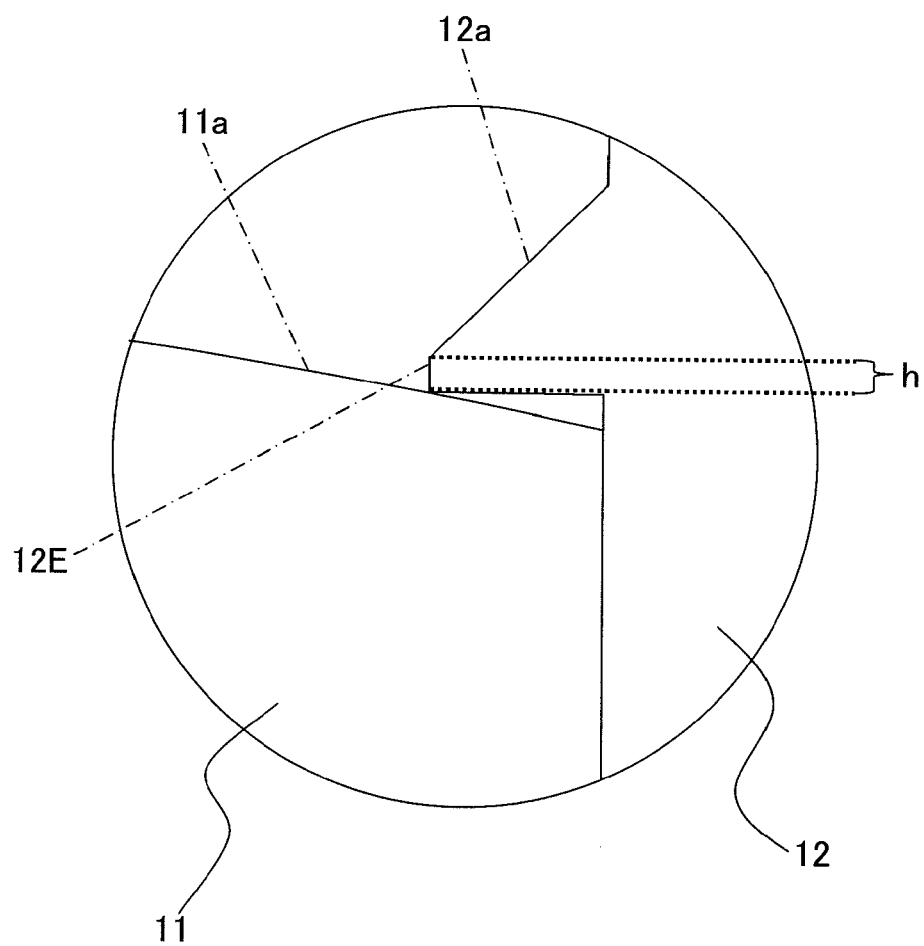
FIG. 4 is a magnified view of a portion of an area R shown in FIG. 3.

It is preferable to attach the holding member so that the surface 12a of the holding member 12, which is brought into contact with the lens, is at 90° with respect to the central axis A of the lens 11 as in the embodiment described above. However, in the present invention, for the reason of, for example, the structure of the lens or the like to be held, an edge surface may be formed at a portion of the surface 12a of the holding member brought into contact with the lens surface, the portion being disposed in the vicinity of the lens surface, in order to fix the lens 11. The term "edge surface" is herein the surface of the holding member 12 which is brought into contact with the lens surface and which is substantially parallel to the central axis of the lens 11. FIGS. 3 and 4 show another embodiment in which the edge surface is formed as described above. FIG. 3 is a schematic vertical sectional view of another preferred embodiment of the lens as depicted in a state that the holding member is attached. FIG. 4 is a magnified view of a portion of an area R shown in FIG. 3.

As shown in FIGS. 3 and 4, when the edge surface 12E is formed, then a step (stepped portion) or a difference in height appears between the surface 11a of the lens and the surface 12a of the holding member at the contacting portion or abutting portion between the lens 11 and the holding member 12, and the liquid pool of the coating liquid tends to appear at the circumferential edge portion of the lens when the spin coating is performed. Therefore, it is fundamentally preferable that the shape of the holding member 12 is designed so that the edge surface 12E is not formed. However, for example, for the convenience of the structure to hold the lens 11, such an edge surface 12E is formed and thus any difference in height appears in some cases. In such a situation, in view of sufficiently avoiding the liquid pool, it is preferable that the height (difference in height) h of the edge surface 12E is not more than 0.5 mm. If the height h of the edge surface 12E exceeds 0.5 mm, then when the optical member is produced, the liquid pool of the coating liquid tends to appear at the portion at which the lens 11 is brought into contact with the holding member 12, and the uniformity of the film thickness of the formed optical thin film tends to be deteriorated. Further, in view of avoiding the liquid pool more efficiently, it is preferable that the angle, which is formed between the edge surface 12E and the central axis A of the lens 11, is not less than 5°.

EXAMPLES

The present invention will be explained more specifically below based on Examples and Comparative Examples. However, the present invention is not limited to Examples described below.

Example 1

An optical member as shown in FIG. 2 was produced by adopting the spin coating by using a lens 11 and a holding member 12 of the embodiment shown in FIG. 1. That is, a hemispherical lens having D/R of 2.0 and a diameter of 8 mm was used as the lens 11, and was spin-coated with a sol solution (coating liquid) in which fine particles of $MgF_2$ were dispersed. The concentration of $MgF_2$ was 2.8% by mass in the coating liquid as described above. Propanol was used for the dispersion medium. As described above, the coating liquid is principally composed of propanol, and hence the viscosity originates from propanol, of which viscosity is low as compared with any coating liquid to be generally used for performing the spin coating. The lens 11 and the holding member 12 were fixed with an adhesive so that any gap and/or any difference in height does not appear at the boundary between the lens 11 and the holding member 12. After the lens 11 was fixed to the support member 20, the lens 11 was set to a spin coater, and the coating liquid was dropped and supplied, producing an optical member with the number of revolutions of 7000 rpm. When the spin coating was performed as described above, then the coating liquid was allowed to flow efficiently from the lens 11 toward the holding member 12, and any liquid pool was not generated at all at the most peripheral portion of the lens. The average film thickness of the formed optical thin film 13 was 140 nm. The film thickness was within a range of ±15.7% of the average film thickness in the entire area.

Comparative Example 1

An optical member was produced in the same manner as in Example 1 except that the holding member 12 was not used. When the optical member was produced as described above, the coating liquid, which was dropped and supplied, was moved on the lens surface toward the most peripheral portion, at which the centrifugal force was exerted most strongly, during a period of several seconds until the coating liquid was dried during the rotation. As a result, the coating liquid was pooled at the most peripheral portion, and an extremely thick film was formed only at the portion at which the coating liquid was pooled.

Evaluation of Optical Characteristics (Spectral Reflection Characteristics) of Optical Members Obtained in Example 1 and Comparative Example 1

The optical thin films obtained in Example 1 and Comparative Example 1 were used and the reflectances were measured by radiating light having wavelengths of 400 to 700 nm onto the apex portion and the most peripheral portion of each of the respective optical thin films. Obtained results are shown in FIG. 5 (Example 1) and FIG. 6 (Comparative Example 1).

Figure 5:
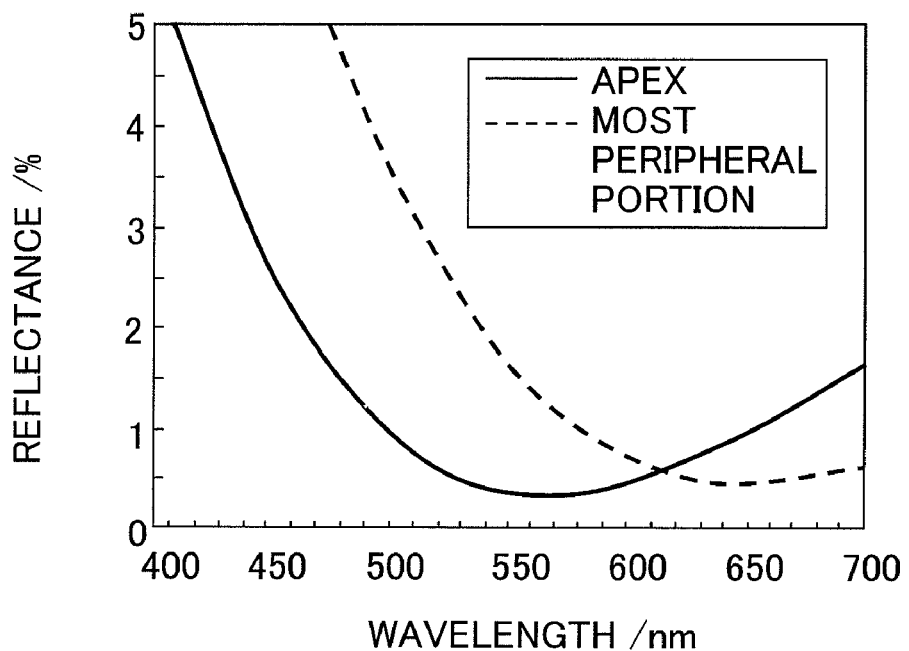
FIG. 5 is a graph illustrating the light reflectances of the apex portion and the most peripheral portion of an optical member obtained in Example 1.
Figure 6:
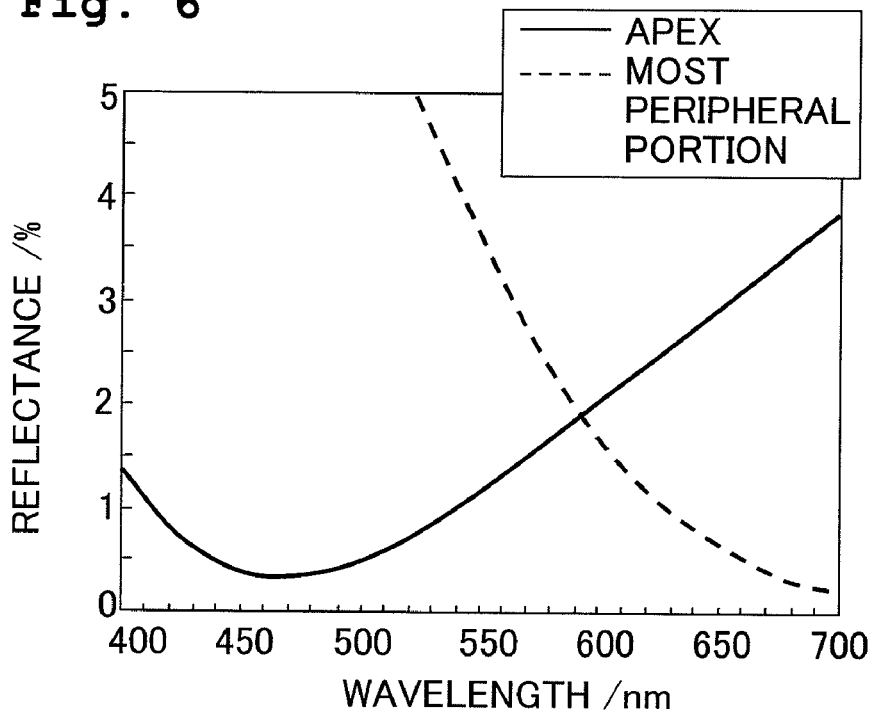
FIG. 6 is a graph illustrating the light reflectances of the apex portion and the most peripheral portion of an optical member obtained in Comparative Example 1.

As appreciated also from the result shown in FIG. 5, in the optical member obtained in Example 1, the difference in the center wavelength was about 90 nm between the most peripheral portion and the central portion; it was confirmed that the film thickness was sufficiently uniform, and the uniformity of the reflection characteristic was excellent. On the contrary, in the optical member obtained in Comparative Example 1, as appreciated also from the result shown in FIG. 6, it was confirmed that even in a case that the center wavelength was 450 nm at the apex portion, the center wavelength of the most peripheral portion was not less than 700 nm which exceeded the measurable range; the unevenness appeared in the film thickness to such an extent that the unevenness was clearly recognizable from the appearance as well. According to the results as described above, it was confirmed that the optical thin film, which had the sufficiently high uniformity of the film thickness, was formed by using the holding member 12.

Examples 2 to 7

Optical members were produced by adopting the spin coating by using lenses 11 and cylindrical holding member 12 as shown in FIGS. 3 and 4. The edge thickness of the lens is represented by a reference numeral "T" in FIG. 3. That is, a coating liquid, which was same as or equivalent to that used in Example 1, was used. As for the lenses 11, the lens diameters were 12 mm (Examples 2 and 5), 16 mm (Examples 3 and 6), and 20 mm (Examples 4 and 7); and the edge thickness T and the radius of curvature of the lenses were 2 mm and 51.3 mm respectively, which were common to the lenses. In Examples 2 to 7, the height h of the difference in height of the edge surface 12E was 0.1 mm (Examples 2 to 4) and 0.2 mm (Examples 5 to 7). The numbers of revolutions during the spin coating were 4000 rpm (in Examples 2 to 4) and 6000 rpm (in Examples 5 to 7) respectively. The edge surface 12E and the central axis A of the lens 11 were parallel to each other. When the spin coating was performed, then the holding member 12 was brought into contact with the support member of the spin coater, and the holding member 12 was fixed by the vacuum chuck. The spin coating was performed under the condition as described above. The average film thickness of the formed optical thin film 13 was 140 nm; and the film thickness was within a range of ±5% of the average film thickness in the entire area of the optical thin film 13.

Comparative Examples 2 to 7

Optical members were produced by adopting the spin coating for the lenses 11 in the same manner as in Examples 2 to 7 except that the holding member 12 was not attached. When the spin coating was performed, the outer circumferential area of the optical surface of the lens was brought into contact with the support member in a doughnut form so that the effective area of the optical surface of the lens did not contact with the support member of the spin coater, and the lens was fixed by the vacuum chuck.

In each of the optical members (Comparative Examples 2 to 7) obtained as described above, any conspicuous liquid pool did not appear at the periphery of the lens, and no problem arose in relation to the uniformity of the film thickness of the surface (coat surface). However, the applied coating liquid flowed to and arrived at the back surface of the lens, and the coating liquid adhered to the effective area of the optical surface as well. Therefore, the obtained optical members (Comparative Examples 2 to 7) did not have any sufficient optical characteristic. The edge thickness T of the lens was 2 mm which was thin, and when the lens was held or griped by the hand, the coat surface was touched by the hand. Therefore, for example, in order to move the lens after coating the lens with the coating liquid, it was necessary to grip the lens by using, for example, a pair of tweezers, which in turn deteriorated the operability. According to the results as described above, when the holding member was not attached (Comparative Examples 2 to 7), the following fact was confirmed. That is, it was necessary to perform, for example, a step of wiping out the coating liquid adhered to the back surface and a step of gripping the lens by using a pair of tweezers, and thus the operability was deteriorated.

Measurement of Liquid Pool

The width of the liquid pool brought about by the spin coating performed in each of Examples 2 to 7 was measured. The width of the liquid pool was measured as the width ranging from the most peripheral or circumferential portion of the lens. Obtained results are shown in FIGS. 7 and 8 (Examples 2 to 7).

Figure 7:
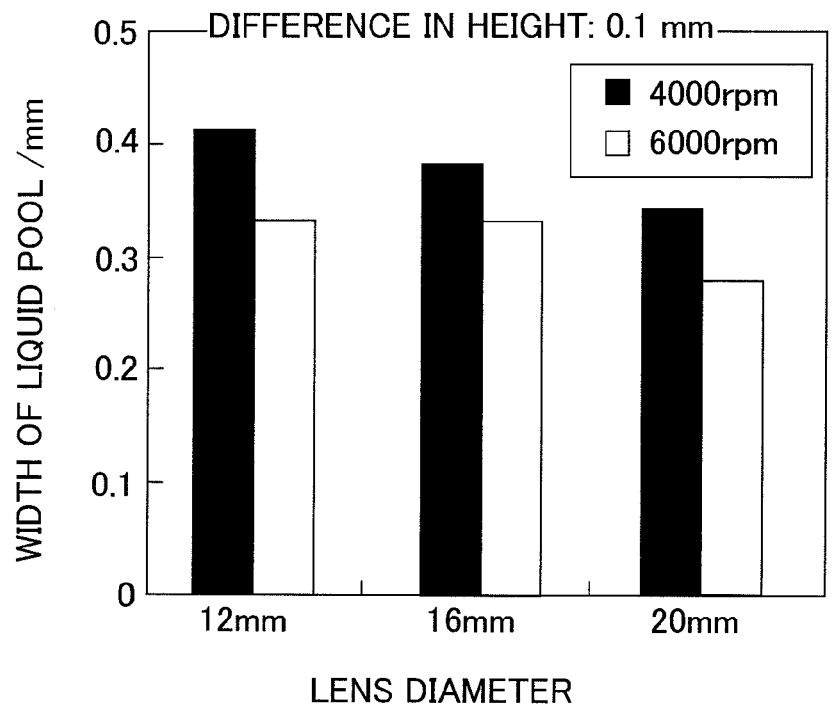
FIG. 7 is a graph illustrating the width of a liquid pool brought about by the spin coating in each of Examples 2 to 7 when the difference in height (height of the edge surface) was 0.1 mm.
Figure 8:
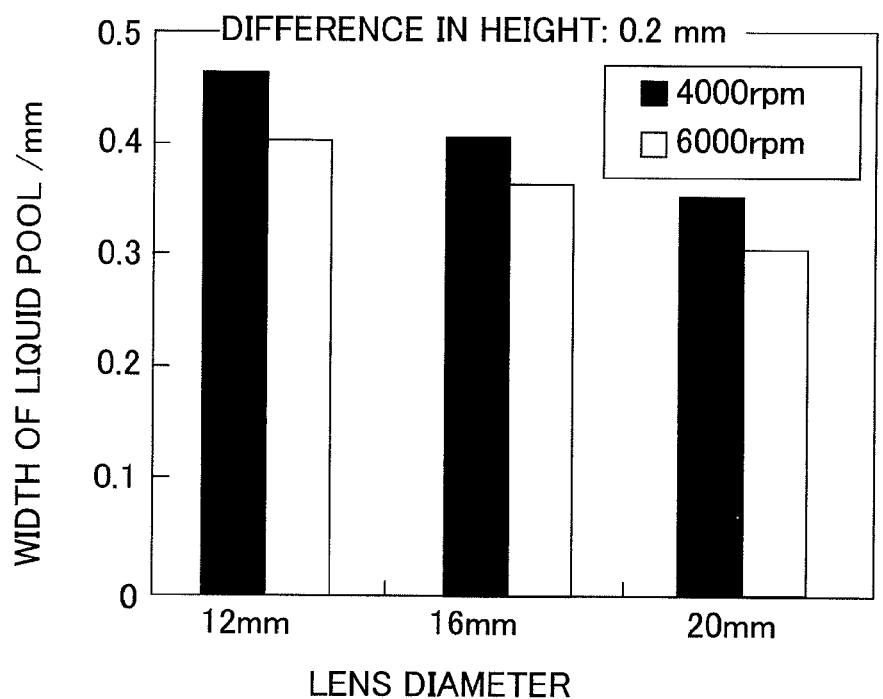
FIG. 8 is a graph illustrating the width of the liquid pool brought about by the spin coating in each of Examples 2 to 7 when the difference in height (height of the edge surface) was 0.2 mm.

As appreciated also from the results shown in FIGS. 7 and 8, the following fact was confirmed. That is, as the diameter of the lens was greater, the height (difference in height) h of the edge surface 12E was smaller and the number of revolutions was greater, then the width of the liquid pool became smaller; and that the width of the liquid pool was smaller by the spin coating performed in Examples 2 to 7. The results as described above is due to that the coating liquid was made to flow on the surface of the holding member 12 in Examples 2 to 7. According to the results described above, it was also confirmed that by attaching the holding member 12, the optical thin film was successfully formed at the high operability even with the small lens and the lens having the thin edge thickness.

As explained above, according to the present invention, it is possible to provide the method for producing the optical member which is capable of forming, on the surface of the lens, the optical thin film which has the sufficiently high uniformity in the thickness while adopting the spin coating; which is capable of forming the optical thin film at high operability even when the lens is small and/or when the lens has a thin edge thickness; which is capable of sufficiently preventing the coating liquid from flowing to and arriving at the back surface of the lens; and which is capable of producing the optical member stably and efficiently, as well as to provide the optical member obtained by the production method.

Therefore, the method for producing the optical member of the present invention can be suitably utilized especially for the method for producing the optical member by using the small lens and/or the lens having the thin edge thickness. The obtained optical member can be suitably utilized for the camera lens, the objective lens of the microscope, etc. Note that by designing the holding member such that the holding member also serves as the fixture or hardware of the objective lens, it is possible to assemble the optical member as it is into various products after the completion of the spin coating, which is reasonable.

What is claimed is:

1. A method for producing an optical member, comprising attaching a holding member, which is used integrally with a lens, to the lens so that the holding member is brought into contact with a periphery of the lens to hold the lens, and then forming an optical thin film on a surface of the lens by a spin coating to obtain the optical member.

2. The method for producing the optical member according to claim 1, wherein the holding member is brought into contact with an area, of the lens, which is not less than 90% of the entire periphery of the lens.

3. The method for producing the optical member according to claim 1, wherein a thickness at an edge of the lens is not more than 5 mm.

4. The method for producing the optical member according to claim 1, wherein a ratio between a diameter of the lens and a radius of curvature of the lens is within a range of 1.5 to 2.0.

5. The method for producing the optical member according to claim 1, wherein an edge surface, which is a surface of the holding member brought into contact with the surface of the lens and which is substantially parallel to a central axis of the lens, has a height of not more than 0.5 mm.

6. The method for producing the optical member according to claim 1, wherein a thickness of the optical thin film is within a range of ±20% with respect to an average thickness in an entire area of the optical thin film.

7. An optical member comprising:

a lens;

a holding member which is attached to the lens so that the holding member is brought into contact with a periphery of the lens to hold the lens and which is used integrally with the lens; and an optical thin film which is formed on a surface of the lens and on a surface of the holding member brought into contact with the periphery of the lens.

8. The optical member according to claim 7, wherein the holding member is brought into contact with an area, of the lens, which is not less than 90% of the entire periphery of the lens.

9. The optical member according to claim 7, wherein a thickness at an edge of the lens is not more than 5 mm.

10. The optical member according to claim 7, wherein a ratio between a diameter of the lens and a radius of curvature of the lens is within a range of 1.5 to 2.0.

11. The optical member according to claim 7, wherein an edge surface, which is a surface of the holding member brought into contact with the surface of the lens and which is substantially parallel to a central axis of the lens, has a height of not more than 0.5 mm.

12. The optical member according to claim 7, wherein a thickness of the optical thin film is within a range of ±20% with respect to an average thickness in an entire area of the optical thin film.

* * * * *